United States Patent Office 3,396,330
Patented Aug. 6, 1968

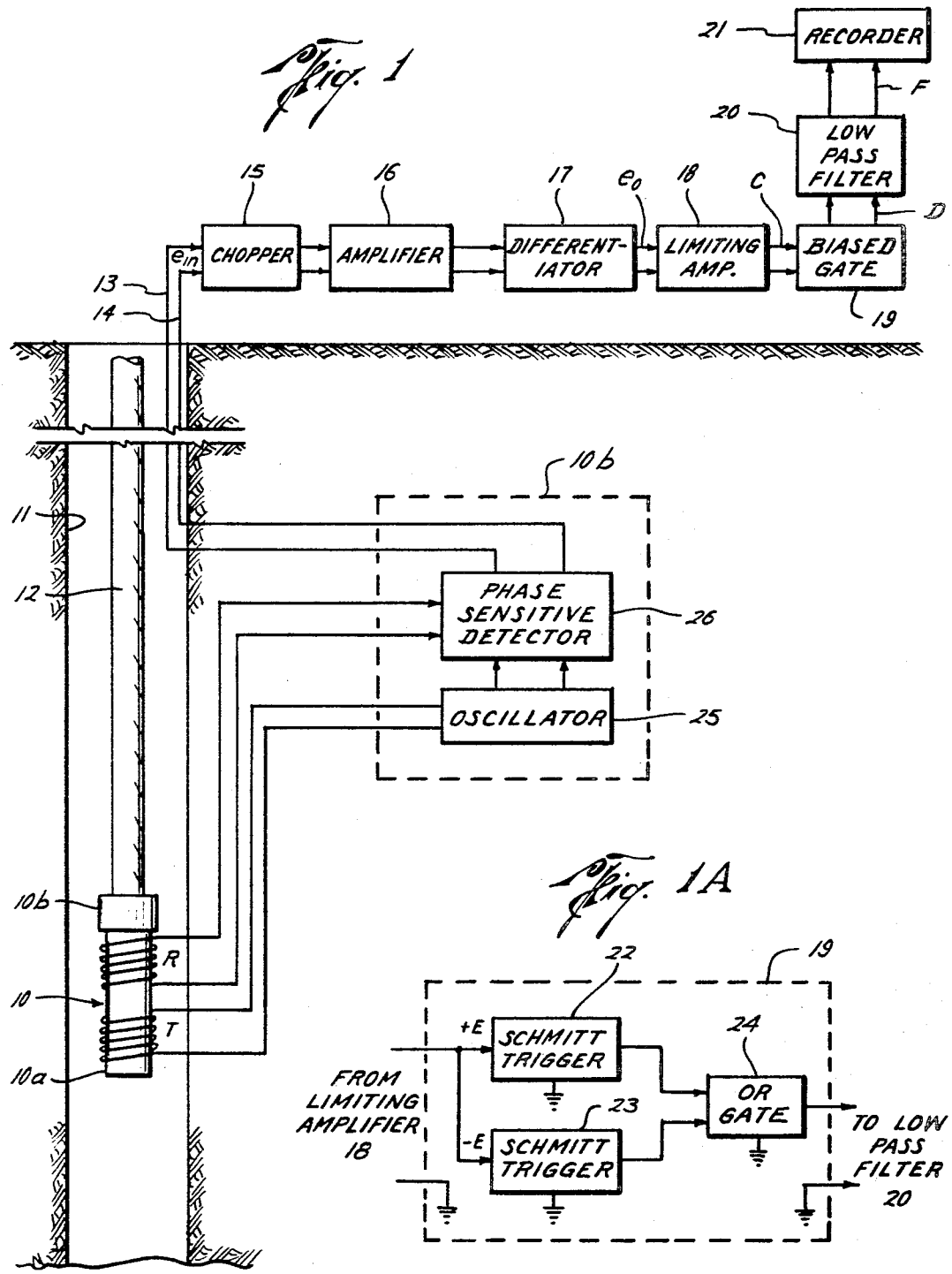

3,396,330
METHODS AND APPARATUS FOR TAKING THE LOGARITHM OF WELL LOGGING MEASUREMENTS UTILIZING A TIME DOMAIN TECHNIQUE
Jimmy Gerald Lee, Clamart, France, assignor, by mesne assignments, to Schlumberger Technology Corporation, Houston, Tex., a corporation of Texas
Filed Dec. 15, 1965, Ser. No. 514,006
3 Claims. (Cl. 324—6)

ABSTRACT OF THE DISCLOSURE

In accordance with an illustrative embodiment of the invention, a technique for taking the logarithm of well logging measurements is disclosed. The well logging measurements are chopped to provide square wave signals and the square wave signals are differentiated. The differentiated square wave signals are then limited in amplitude and applied to a biased gate arrangement which produces pulses during the positive and negative amplitude excursions of the differentiated square wave. The pulse width of these pulses is representative of the logarithm of the well logging measurements, which pulses are converted to a substantially DC signal whose amplitude is proportional to the logarithm of the well logging measurements.

---

This invention relates to methods and apparatus for the logging of a borehole drilled into the earth where measurements of the surrounding earth formations are taken throughout the length of the borehole to provide indications of oil or gas bearing strata. These logging measurements produce signals which may vary over a very large range of values due to wide variations in the composition of the surrounding earth formations. It is desirable to accurately record all of the well logging measurement signals ranging from extremely small signals to extremely large signals. However, if a linear recording device provides indications of extremely high signal levels, the extremely low signal values will not be indicated with any appreciable degree of resolution by the recording device.

One manner in which a widely varying signal can be accurately measured by a recording device is to compress the scale of the recording device in a non-linear manner so that low signal levels will have high resolution, and high signal levels may also be recorded. One way of compressing the scale in a non-linear manner is to provide a signal to the recording device which is the logarithm of the well logging measurement signal.

When investigating earth formations surrounding a borehole, one investigating method does not always provide sufficient information to accurately determine the locations and extent of oil bearing strata. In some cases, several different well logging methods must be utilized and the results therefrom combined to determine the location and extent of oil bearing strata. In some cases, the results from several investigating methods must be combined by multiplication or division. This combination process is sometimes made sufficiently easier if the well logging measurements are in the form of logarithms.

If a logarithmic scale is used, percentage-type errors in the recorded values due to drifts in the investigating or recording apparatus can easily be corrected by merely sliding the scale by the amount of error. In other words, a certain percent of error will cause a shift throughout a logarithmic scale by the same distance.

One manner of providing the logarithm of a widely varying DC input signal is to utilize diodes having logarithmic characteristics. However, it is difficult to maintain a high degree of accuracy using these diodes due to environmental changes, and expensive temperature regulated ovens must be utilized to maintain good accuracy.

It is an object of the invention, therefore, to provide new and improved methods and apparatus for converting well logging measurements made within a borehole to a logarithmic function of the well logging measurements.

It is another object of the invention to provide new and improved methods and apparatus for converting a widely varying linear DC input signal to an output signal which varies as the logarithm of the linear DC input signal.

It is still another object of the invention to provide new and improved methods and apparatus for converting a widely varying DC signal to a logarithmic function of that DC signal utilizing relatively simple circuitry having a large dynamic range.

It is still another object of the invention to provide new and improved methods and apparatus for accurately converting a widely varying linear DC input signal to an output signal which varies as the logarithm of the linear DC input signal without relying on the accuracy or characteristics of non-linear devices.

In accordance with one feature of the invention, methods and apparatus for processing well logging measurements representative of a characteristic of earth formations traversed by a borehole comprises providing well logging measurements representative of the characteristic of earth formations, and converting the well logging measurements to a substantially square wave signal, the amplitude of the square wave signal representative of the well logging measurements. The invention further comprises converting the square wave signal to a time function signal whose amplitude varies with time in accordance with a given function and generating a pulse type signal in response to the time function signal, a time characteristic of the pulse type signal being representative of the given function of the well logging measurements. An output signal whose amplitude is representative of the function of the well logging measurements is then generated in response to the pulse type signal. A separate pulse may be generated in response to both the positive and negative amplitude excursions of the time function signal. In a preferred form, the square wave signals are differentiated so that the time function is a logarithmic function. To prevent overdriving the pulse generating means, the differentiated square wave signals are desirably limited in amplitude.

For a better understanding of the present invention, together with other and further objects thereof, reference is had to the following description taken in connection with the accompanying drawings, the scope of the invention being pointed out in the appended claims.

Referring to the drawings:

FIG. 1 illustrates a tool for making well logging measurements within a borehole together with a schematic diagram of apparatus for converting the well logging measurements to signals representative of the logarithm of the well logging measurements.

FIG. 1A shows an example of a biased gate that could be utilized with the FIG. 1 apparatus.

Figure 2A:
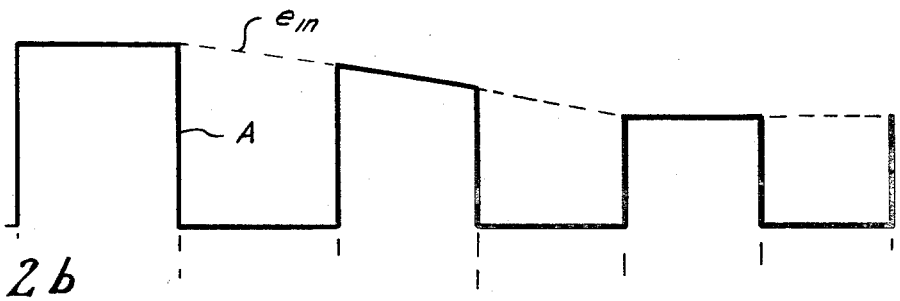
FIGS. 2a–2d illustrate the wave shapes of the signal at different points in the FIG. 1 apparatus.

Referring now to FIG. 1, there is shown a tool 10 within an earth borehole 11 adapted for investigating the subsurface earth formations surrounding the borehole 11. A cable 12 supports the tool 10 within the borehole 11 and is raised and lowered in and out of the borehole by a suitable capable reeling device (not shown) at the surface of the earth. A transmitter coil T and a receiver coil R are wound around a support member 10a, which is made of a non-conductive, non-magnetic material. Each coil is thus of the cylindrical solenoid type with the longitudinal axis of the coils T and R in line with one another and generally in line with the longitudinal axis of the borehole 11.

A power supply (not shown) at the surface of the earth supplies power to the downhole circuits, which are located inside of the dotted line box 10b which corresponds to the portion 10b of tool 10. An oscillator 25 supplies an alternating current to the transmitter coil T. This alternating current in the transmitter coil T creates an electromagnetic flux field surrounding the transmitter coil T. This alternating flux field creates a secondary current flow, commonly referred to as "eddy current," in the earth formations adjacent to the transmitter coil T. This flow of secondary current in the earth formations The magnitude of this voltage component is generally proportional to the magnitude of the secondary current induces a voltage component in the receiver coil R. flow which, in turn, is proportional to the conductivity value of the earth formation material.

This voltage component received by the receiver coil R is supplied to a phase-sensitive detector 26, to which also is supplied a phase-reference signal from oscillator 25. Phase-sensitive detector 26 provides a direct-current output voltage which is proportional to that portion of the voltage from receiver coil R which is in-phase with the phase-reference signal from oscillator 25. This in-phase portion of the voltage received by receiver coil R is proportional to the conductivity of the earth formations adjacent to tool 10 and thus comprises the well logging measurement. The direct-current output voltage from phase-sensitive detector 26 is supplied to the surface of the earth via conductors 13 and 14. Conductors 13 and 14 pass through armored multi-conductor cable 12, but are shown outside of cable 12 for purposes of clarity of the electrical schematic.

The induction logging apparatus of FIG. 1 is merely an example of apparatus for investigating earth formations, which could be utilized with the present invention. Any other type of earth formations investigating apparatus could be utilized, as for example, the induction logging system shown in U.S. Patent No. 3,147,429 granted to J. H. Moran on Sept. 1, 1964, or the electrode system shown in U.S. Patent No. 3,031,612 granted to M. F. Easterling on Apr. 24, 1962, etc.

The well logging measurements made by tool 10 are supplied to the surface of the earth by conductors 13 and 14 which pass through armored multi-conductor cable 12. Conductors 13 and 14, at the surface of the earth, are connected to a chopper 15 of conventional design which transforms the signals on conductors 13 and 14 to square wave signals of any desired frequency, normally several times the maximum frequency of the well logging measurement signals on conductors 13 and 14. The chopped well logging measurement signals from chopper 15 are supplied to an amplifier 16 which is adapted to handle the maximum possible voltage of the square wave signals from chopper 15 without serious distortion.

The square wave output signal from amplifier 16 is supplied to a differentiator 17 having a time constant which is much less than the period of the square wave from amplifier 16. The positive and negative pulses from differentiator 17 are amplified and then limited at a constant positive voltage on the positive going pulses and a constant negative voltage on the negative going pulses, by limiting amplifier 18 which positive and negative limiting voltages are symmetrical with respect to zero volts. The limiting portion of limiting amplifier 18 is on the output of the amplifier portion thereof. The greater the amplification of chopper 15, amplifier 16, differentiator 17, and the amplifier portion of limiting amplifier 18, the greater will be the dynamic range of the system as will be discussed later.

The output pulses from limiting amplifier 18 are supplied to a biased gate 19 which provides a constant current output signal for that period of time when the output pulses from limiting amplifier 18 are at the constant positive and negative voltage as determined by limiting amplifier 18. Biased gate 19 comprises any type of gating circuit for providing a constant current output signal upon the applied input signal attaining a desired voltage. The output from biased gate 19 is supplied to a suitable low pass filter 20 of conventional design for smoothing the output pulses from biased gate 19. The low pass filter 20 has an RC time constant sufficiently high with respect to the frequency of chopper 15 to provide the substantially DC signal. Since the low pass filter 20 time constant is large and a constant current is supplied to it during the period of the output pulses of biased gate 19, the low pass filter 20 is a pulse width to current magnitude converter. The pulse width of the pulses from biased gate 19 are proportional to the logarithm of the amplitude of the input signal applied to conductors 13 and 14, as will be shown in detail later. Since the frequency of chopper 15 is constant, low pass filter 20 provides a substantially DC signal proportional to the pulse width of the pulses from biased gate 19. Thus, the output of low pass filter 20 is a DC signal proportional to the logarithm of the well logging measurement signal on conductors 13 and 14. This logarithmic function is recorded by recorder 21.

Figure 2B:
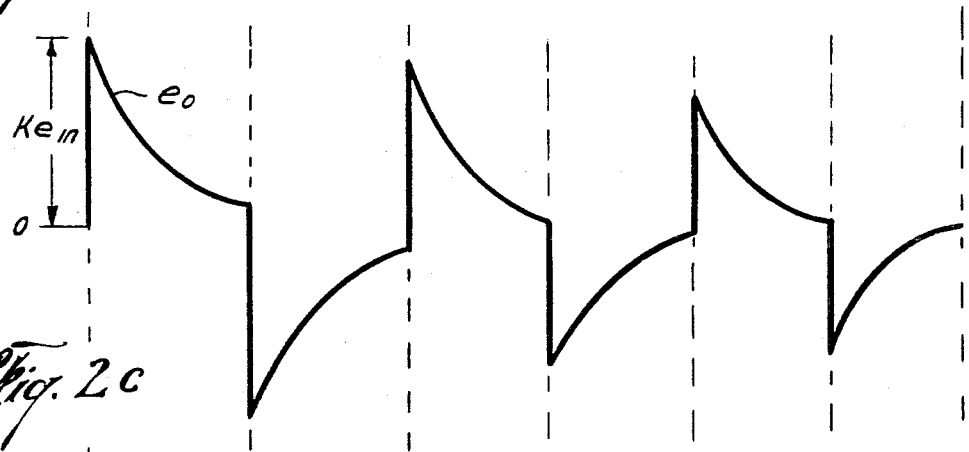

To better understand the operation of the FIG. 1 apparatus, refer to FIGS. 2(a)–2(d) where the wave shapes of the signals at different points in the FIG. 1 apparatus are shown. In FIG. 2(a), there is shown the well logging measurement voltage $e_{in}$ present on conductors 13 and 14 indicated by a dotted line. The output square wave voltage A from chopper 15 is represented by the solid line A in FIG. 2(a). Thus, it can be seen that the voltage amplitude of the square wave signal A from chopper 15 follows the well logging measurement $e_{in}$. FIG. 2(b) shows the differentiated square wave voltage output $e_0$ from differentiator 17.

The peak voltage of the differentiated square wave signal $e_0$ is proportional to the voltage of the square wave signal output from chopper 15, as shown in FIG. 2(b). However, the well logging measurements $e_{in}$ have a very large dynamic range and for good accuracy for low levels of $e_{in}$, high amplification is required. Therefore, the amplification by chopper 15, amplifier 16, differentiator 17, and the amplifier portion of limiting amplifier 18, in order to have god accuracy for low input signal levels, will provide very large voltages for a high level input signal. This very high voltage would be very difficult to handle. Thus, the voltage output from the amplifier portion of limiting amplifier 18 is limited to provide a reasonable voltage, and at the same time, the benefits of the high amplification are retained, since the differentiated square wave $e_0$ of FIGS. 2(b) and 2(c) is undistorted.

Figure 2C:
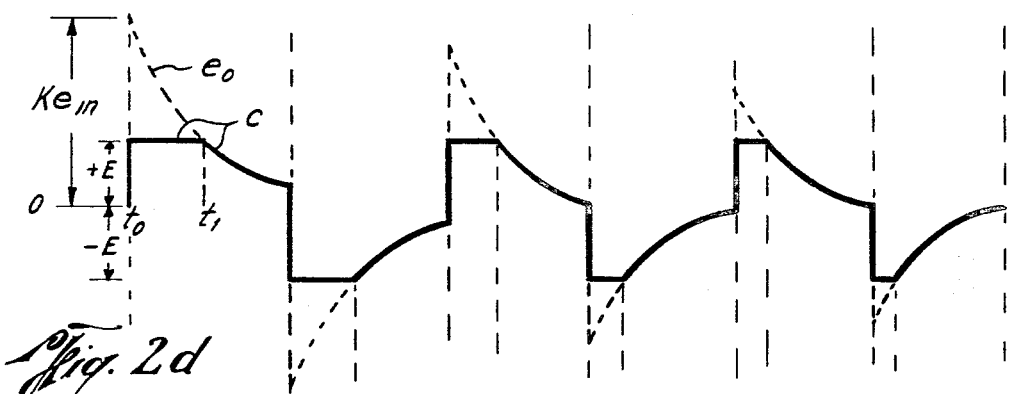

Looking at FIG. 2(c), the pulses represented by the solid line C represents the output voltage from limiting amplifier 18. The pulses represented by the dotted lines $e_0$ in FIG. 2(c) are the same pulses $e_0$ represented by the solid line $e_0$ in FIG. 2(b). The voltage magnitude E represents the voltage at which limiting amplifier 18 limits the positive and negative pulses from differentiator 17. The time which the output pulses C from limiting amplifier 18 remains constant at the limiting voltage E is the interval between $t_0$ and $t_1$. This time interval $t_0$ to $t_1$ is proportional to the logarithm of the well logging measurement signal $e_{in}$ in FIG. 2(a).

It is helpful at this point to prove that this time interval $t_0$ to $t_1$ in FIG. 2(c) is proportional to the logarithm of the well logging measurement $e_{in}$. The voltage $e_0$ of the output pulse from differentiator 17, designated $e_0$ in FIGS. 2(b) and 2(c), can be written as:

$$e_0 = K e_{in} \epsilon^{-t/RC} \tag{1}$$

where $t$ is time interval from time $t_0$, RC is the time constant of the differentiator, and K is the sum of the voltage gains of chopper 15, amplifier 16, differentiator 17, and limiting amplifier 18. It is known that at time $t_1$, $e_0$ is equal to the limiting voltage E of limiting amplifier 18. Substituting this into Equation 1, gives $$E = K e_{in} \epsilon^{-t_1/RC} \tag{2}$$

Taking the logarithm of both sides of Equation 2 and rearranging, gives $$t_1 = RC(\log_\epsilon 10) \log_{10}\left(\frac{K e_{in}}{E}\right) \tag{3}$$

Since R, C, K and E are constants, it can be seen from Equation 3 that the time interval $t_0$ to $t_1$ is proportional to the logarithm of the well logging measurements $e_{in}$. The same argument applies to the negative portion of the pulses C in FIG. 2(c).

Figure 2D:
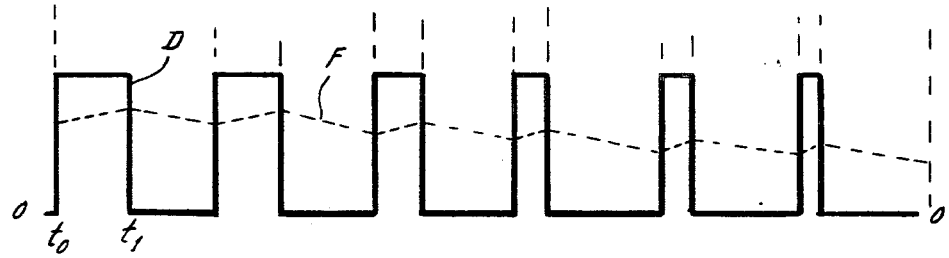

The train of pulses in FIG. 2(d) represents the output from biased gate 19. Biased gate 19 provides a constant current output pulse during the interval $t_0$ to $t_1$ when the waveform C of FIG. 2(c) is at the constant voltage E of limiting amplifier 18. Biased gate 19 provides positive output pulses on both the positive and negative portions of the waveform C of FIG. 2(c), as shown in FIG. 2(d).

Referring to FIG. 1(A), there is shown an example of a typical construction of biased gate 19. The output from limiting amplifier 18 is supplied to Schmitt triggers 22 and 23. Schmitt trigger 22 supplies a positive constant current output signal when the input voltage from limiting amplifier 18 reaches the voltage level +E. Schmitt trigger 23 supplies a positive constant current output when the input voltage from limiting amplifier 18 reaches the voltage level −E. Thus, Schmitt trigger 22 is supplying a positive constant current output signal during the time interval when the waveform C of FIG. 2(c) is above the voltage level +E and Schmitt trigger 23 is supplying a positive constant current output signal when waveform C is below the voltage level −E. These positive output pulses are supplied to OR gate 24 whose output is supplied to low pass filter 20.

Referring back to FIG. 2(d), the output current from low pass filter 20 is shown as the dotted line F in FIG. (d). It can be seen from FIG. 2(d) that low pass filter 20 smoothes out the constant current output pulses from biased gate 19 and supplies a substantially DC signal which is proportional to the pulse width $t_0$ to $t_1$ of the output pulses from biased gate 19.

Looking at FIGS. 2(a)–2(d), it can be seen that as the well logging measurement $e_{in}$ of FIG. 2(a) varies, the magnitude $K e_{in}$ of the differentiated waveform $E_0$ of FIG. 2(b) varies directly. From FIG. 2(c), the limiting voltage E of limiting amplifier 18 remains constant. However, the greater the magnitude of $K e_{in}$, the longer the time interval that the output voltage $E_0$ from differentiator 17 will exceed the constant voltage (+ and −) E, and thus the pulse width $t_0$ to $t_1$ of the waveform D of FIG. 2(d) will be greater. Thus, the output F from low pass filter 20 will change as the time interval $t_0$ to $t_1$ changes.

By providing high amplification in the apparatus of FIG. 1, the time interval $t_0$ to $t_1$ becomes greater, thus providing accuracy over the entire range of input values. The maximum value of the time interval $t_0$ to $t_1$ is determined by the chopping frequency of chopper 15. By limiting the differentiated square wave, the large dynamic range can be maintained when reasonable voltage values are encountered.

Thus, it can be seen that the well logging measurements $e_{in}$ are converted to a logarithmic function by converting the well logging measurements $e_{in}$ to a signal having a time characteristic which is representative of the amplitude of the well logging measurements.

While there has been described what is at present considered to be a preferred embodiment of this invention, it will be obvious to those skilled in the art that various changes and modifications may be made therein without departing from the invention, and it is therefore, intended to cover all such changes and modifications as fall within the true spirit and scope of the invention.

What is claimed is:

1. A method of processing well logging measurements representative of a characteristic of earth formations traversed by a borehole, comprising:
    (a) providing well logging measurements representative of the characteristic of the earth formations;
    (b) converting the well logging measurements to a square wave signal, the amplitude of the square wave signal representative of the well logging measurements;
    (c) differentiating the square wave signal to produce a differentiated square wave signal;
    (d) limiting the amplitude excursions of the differentiated square wave signal to a desired amplitude level;
    (e) generating a pulse type signal in response to a given amplitude level of the limited, differentiated square wave signal, a time characteristic of the pulse type signal being representative of the logarithm of the well logging measurements; and
    (f) producing a DC type output signal in response to the time characteristic of the pulse type signal, the amplitude of the DC type output signal being representative of the logarithm of the well logging measurements.

2. A system for processing well logging measurements representative of a characteristic of earth formations traversed by a borehole, comprising:
    (a) means for providing well logging measurements representative of the characteristic of the earth formations;
    (b) means for converting the well logging measurements to a substantially square wave signal, the amplitude of the square wave signal representative of the well logging measurements;
    (c) means for differentiating the square wave signal to produce a differentiated square wave signal;
    (d) means for limiting the amplitude excursions of the differentiated square wave signal to a given amplitude level;
    (e) means for generating a pulse type signal in response to a given amplitude level of the limited, differentiated square wave signal, a time characteristic of the pulse type signal being representative of the logarithm of the well logging measurements; and
    (f) means responsive to the time characteristic of the pulse type signal to produce an output signal, the amplitude of the output signal being representative of the logarithm of the well logging measurements.

3. A system for processing well logging measurements representative of a characteristic of earth formations traversed by a borehole, comprising:
    (a) means for providing well logging measurements representative of the characteristic of the earth formations;
    (b) means for converting the well logging measurements to a substantially square wave signal, the amplitude of the square wave signal representative of the well logging measurements;

(c) means for differentiating the square wave signal to produce a differentiated square wave signal;

(d) means for limiting the positive and negative excursions of the differentiated square wave signal to a given maximum positive and negative amplitude level;

(e) means responsive to the limited, differentiated square wave signal for generating pulses in response to both the positive and negative excusions of the limited, differentiated square wave signal, the pulse width of each pulse being representative of the time which the positive or negative excursions of the limited, differentiated square wave is greater than selected positive and negative amplitude levels; and (f) means responsive to the pulse width of the pulses to produce a substantially DC output signal, the amplitude of which is representative of the logarithm of the well logging measurements.

References Cited

UNITED STATES PATENTS

| | | | |
|---|---|---|---|
| 3,020,471 | 2/1962 | Barringer | 324—6 |
| 3,092,719 | 6/1963 | Bravenec | 324—1 XR |
| 3,329,889 | 7/1967 | Tanguy | 324—10 XR |
| 2,600,423 | 6/1952 | Nolle | 328—145 X |
| 3,120,647 | 2/1964 | Bravenec | 328—145 X |
| 3,226,633 | 12/1965 | Schneider | 324—1 X |
| 3,237,113 | 2/1966 | Klein | 328—150 |

FOREIGN PATENTS

| | | |
|---|---|---|
| 1,261,248 | 4/1961 | France. |

RUDOLPH V. ROLINEC, *Primary Examiner.*

G. R. STRECKER, *Assistant Examiner.*